United States Patent
Davis

(10) Patent No.: US 9,995,187 B2
(45) Date of Patent: Jun. 12, 2018

(54) INTAKE VALVE APPARATUS FOR USE WITH A COMBUSTION ENGINE AND METHODS OF USE AND MANUFACTURE THEREOF

(71) Applicant: Honda Motor Co., Ltd., Tokyo (JP)

(72) Inventor: Scott Davis, Raymond, OH (US)

(73) Assignee: HONDA MOTOR CO., LTD., Tokyo (JP)

( * ) Notice: Subject to any disclaimer, the term of this patent is extended or adjusted under 35 U.S.C. 154(b) by 96 days.

(21) Appl. No.: 15/006,195

(22) Filed: Jan. 26, 2016

(65) Prior Publication Data

US 2017/0211433 A1 Jul. 27, 2017

(51) Int. Cl.
| | |
|---|---|
| *F01L 3/20* | (2006.01) |
| *F01L 3/00* | (2006.01) |
| *F01L 3/12* | (2006.01) |
| *F02M 63/00* | (2006.01) |
| *F16K 1/36* | (2006.01) |

(52) U.S. Cl.
CPC .............. *F01L 3/20* (2013.01); *F01L 3/00* (2013.01); *F01L 3/12* (2013.01); *F02M 63/008* (2013.01); *F02M 63/0078* (2013.01); *F16K 1/36* (2013.01)

(58) Field of Classification Search
CPC .. F16K 1/36; F01L 3/20; F02M 3/008; F02M 63/0078
USPC ........... 251/356, 368, 366; 123/188.3, 188.2, 123/188.7, 188.4, 41.41, 41.34; 29/888.453, 888.45
See application file for complete search history.

(56) References Cited

U.S. PATENT DOCUMENTS

| | | |
|---|---|---|
| 5,934,648 A | 8/1999 | Rivers et al. |
| 6,345,598 B1 | 2/2002 | Bogdanovich et al. |
| 6,551,371 B1 | 4/2003 | Furuta et al. |
| 6,553,956 B2 | 4/2003 | Hora et al. |
| 6,599,467 B1 | 7/2003 | Yamaguchi et al. |
| 7,862,007 B2 | 1/2011 | Schlegl et al. |
| 7,905,468 B2 | 3/2011 | Stark et al. |
| 8,893,680 B2 | 11/2014 | Yagi |

(Continued)

FOREIGN PATENT DOCUMENTS

| | | |
|---|---|---|
| GB | 2520576 A | 5/2015 |
| JP | 2003343219 A | 12/2003 |
| WO | 2003100223 A1 | 12/2003 |

OTHER PUBLICATIONS

Dave Cooper, 'Validation testing of ALM intake valves,' University of Warwick, Apr. 2015.

*Primary Examiner* — Kevin Murphy
*Assistant Examiner* — Kelsey Cary
(74) *Attorney, Agent, or Firm* — Kenealy Vaidya LLP

(57) ABSTRACT

Some embodiments are directed to a valve assembly for use with a combustion engine. The valve assembly can include a valve stem having a plunger end, and a valve head having a stem portion disposed along a central axis and connected to the plunger end of the valve stem. The valve head can have a hollow interior portion defining interior floor and ceiling surfaces, and include ribs that extend between the interior floor and ceiling surfaces. The ribs can also extend radially around the central axis of the valve head from the stem portion to an outer circumference of the hollow interior portion. Additionally, the ribs can be configured such that a majority of an upper surface of each rib contacts the ceiling surface.

20 Claims, 6 Drawing Sheets

(56) References Cited

U.S. PATENT DOCUMENTS

2007/0145322 A1* 6/2007 Stark ................... B21K 1/22
251/356
2015/0013144 A1 1/2015 Bush et al.
2015/0044084 A1 2/2015 Hofmann et al.

* cited by examiner

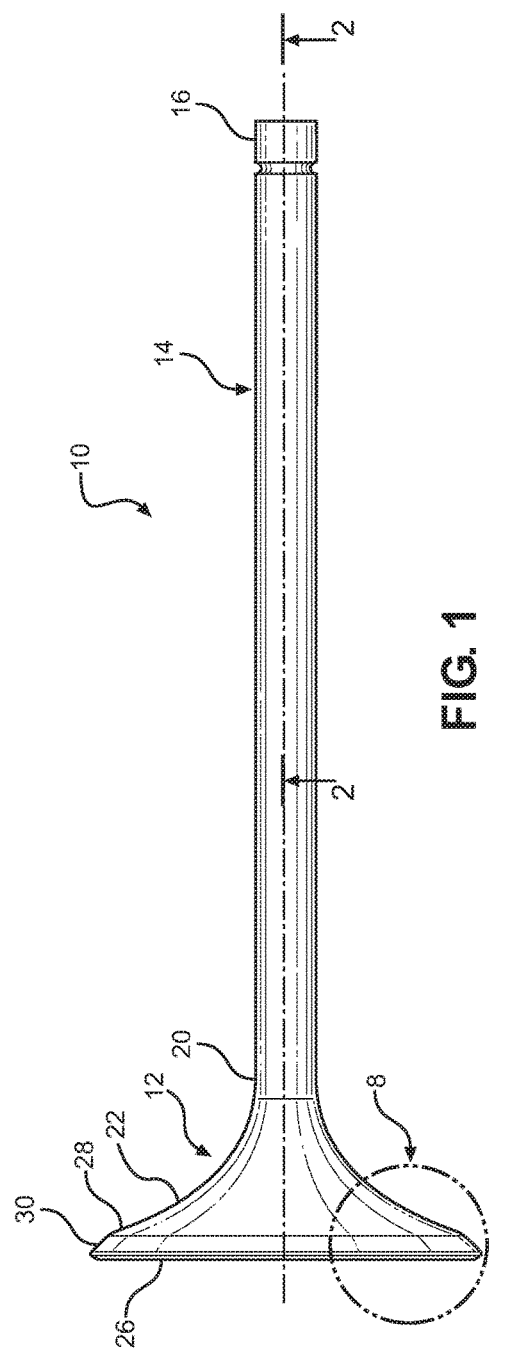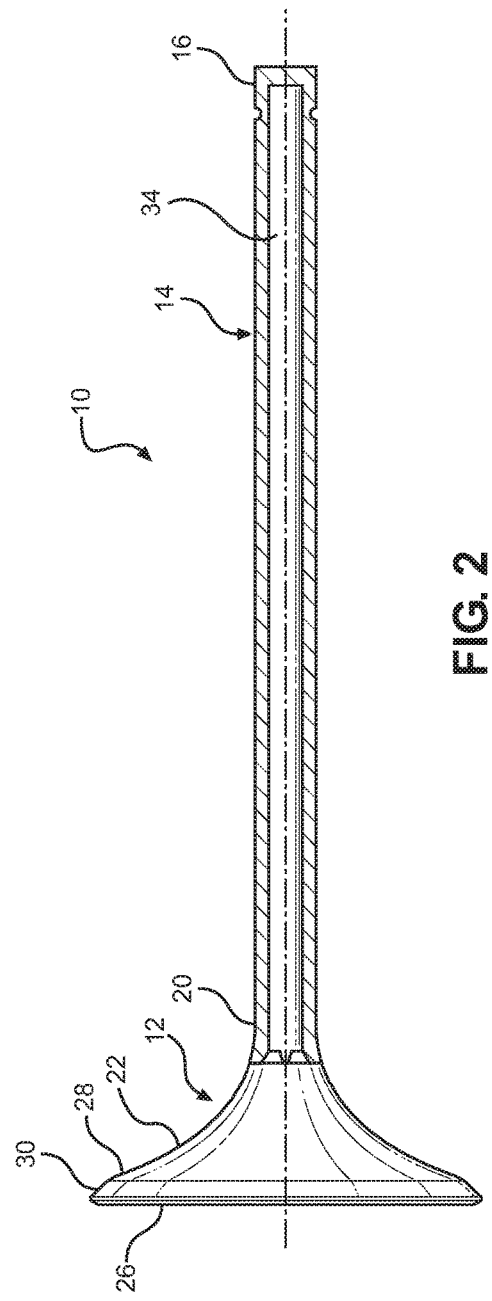

INTAKE VALVE APPARATUS FOR USE WITH A COMBUSTION ENGINE AND METHODS OF USE AND MANUFACTURE THEREOF

BACKGROUND

The disclosed subject matter relates to an intake valve apparatus for use with a combustion engine and methods of use and manufacture thereof. More particularly, the disclosed subject matter relates to methods and apparatus for enhancing performance of combustion engines based upon intake valve structures and configurations.

Many different types of vehicles and portable machinery include combustion engines that are configured to power the vehicle or machinery. In some cases, certain combustion engines, such as internal combustion engines, are provided with various components including cylinders, pistons, and valves. For example, pistons can be disposed within corresponding cylinders, the cylinders also including valves. A valve configured to open and close an aperture in a cylinder facilitates the flow of gases and fluids into the cylinder. Once inside the cylinder, the gases and fluids can be ignited, causing an explosion. The resulting explosion within the cylinder acts on the piston, forcing the piston to move. This movement by the piston is translated to a drive shaft, which can then power a vehicle or portable machinery.

SUMMARY

It can be beneficial to reduce the mass of engine components, specifically the aforementioned moving components. Reducing the mass of moving components in the engine serves to lessen the energy required to move the components, both to initiate as well as stop movement of the components. Decreasing energy required to move engine components can result in increased responsiveness and efficiency of the engine. However, reducing mass of the moving components in an engine can also have detrimental effects regarding the structural integrity of those components. Specifically, components that are made partially hollow in an effort to reduce mass have weakened structures due to lack of support and reinforcement. Weakened components are therefore more prone to fatigue and failure as a result of engine operation.

More specifically, it is detrimental to provide hollow portions of the valves to reduce reciprocating mass without providing for support and reinforcements throughout those hollow portions. The valves are under constant force of valve springs to maintain a tight seal within respective cylinders, which also requires a rim of the valves to press against a seat of the cylinders when the valves are in closed positions. Additionally, the portions of the valves exposed to the explosions (fire face) within the cylinders experience significant forces acting thereon. Due to these forces acting on the valves, structural integrity of the valves must be maintained despite having hollowed portions to reduce mass.

Thus, it may be beneficial to provide an arrangement of supports or ribs within the hollow portions of engine valves to reinforce those portions. Ribs can extend through the hollow portions and be oriented in a variety of ways to provide reinforcement. For example, ribs can extend through portions of the valve that contacts the cylinder seat. This portion is particularly prone to fatigue and failure when hollow due to the pressing forces from the valve spring against the cylinder seat. Additionally, the portion of the valve proximate to explosions within the cylinder can also be reinforced with ribs to avoid detrimental effects of the explosive force acting on the valve. Furthermore, portions of connection between plunger and stem portions of the valve can be reinforced to lessen the risk of breakage at that connection, since the stem is relatively thin.

It may therefore be beneficial to address at least one of the issues disclosed above, and/or address other issues. For example, it may be beneficial to provide a valve assembly that includes a valve stem having a plunger end, and a valve head having a stem portion disposed along a central axis and connected to the plunger end of the valve stem. The valve head can have a hollow interior portion defining interior floor and ceiling surfaces, and include ribs that extend between the interior floor and ceiling surfaces. The ribs can also extend radially around the central axis of the valve head from the stem portion to an outer circumference of the hollow interior portion. Additionally, the ribs can be configured such that a majority of an upper surface of each rib contacts the ceiling surface. The above configurations of the valve assembly serve to minimize mass while maintaining mechanical and thermal capability. Particularly, the rib configuration facilitates stiffer fire face and stem sections, and better heat transfer from the fire face of the valve to both the seat and stem. The reduced mass from the hollowing and reinforcing of the valve assembly reduces the load on the valve spring, thereby improves fatigue life. Aggressive engine cam profiles are also possible due to enhanced engine responsiveness and efficiency resulting from the reinforced valve assembly configurations described above.

Some embodiments are therefore directed to a valve assembly for use with a combustion engine. The valve assembly can include a valve stem having a plunger end, and a valve head having a stem portion disposed along a central axis and connected to the plunger end of the valve stem. The valve head can have a hollow interior portion defining interior floor and ceiling surfaces, and include ribs that extend between the interior floor and ceiling surfaces. The ribs can also extend radially around the central axis of the valve head from the stem portion to an outer circumference of the hollow interior portion. Additionally, the ribs can be configured such that a majority of an upper surface of each rib contacts the ceiling surface.

Some other embodiments are directed to a valve head assembly for use with a valve stem that thereby forms a valve assembly for use with a combustion engine. The valve head assembly can include a valve head having a central axis and a stem portion. The valve head can have a hollow interior portion defining interior floor and ceiling surfaces, and include ribs that extend between the interior floor and ceiling surfaces. The ribs can also extend radially around the central axis of the valve head from the stem portion to an outer circumference of the hollow interior portion. Additionally, the ribs can be configured such that a majority of an upper surface of each rib contacts the ceiling surface.

Still other embodiments are directed to a method of manufacturing a valve assembly for use with a combustion engine. The method can include: providing a valve stem having a plunger end; and connecting a valve head having a central axis and a stem portion to the plunger end of the valve stem, the valve head having a hollow interior portion defining interior floor and ceiling surfaces, the valve head including ribs that each extend between the interior floor and ceiling surfaces and that extend radially around the valve head central axis from the stem portion to an outer circumference of the hollow interior portion, the ribs being configured such that a majority of an upper surface of each rib contacts the ceiling surface.

BRIEF DESCRIPTION OF THE DRAWINGS

The disclosed subject matter of the present application will now be described in more detail with reference to exemplary embodiments of the apparatus and method, given by way of example, and with reference to the accompanying drawings, in which:

FIG. 1 is plan view of an exemplary valve assembly in accordance with the disclosed subject matter.

FIG. 2 is a cross-section view of the exemplary valve assembly.

DETAILED DESCRIPTION OF EXEMPLARY EMBODIMENTS

Figure 3:
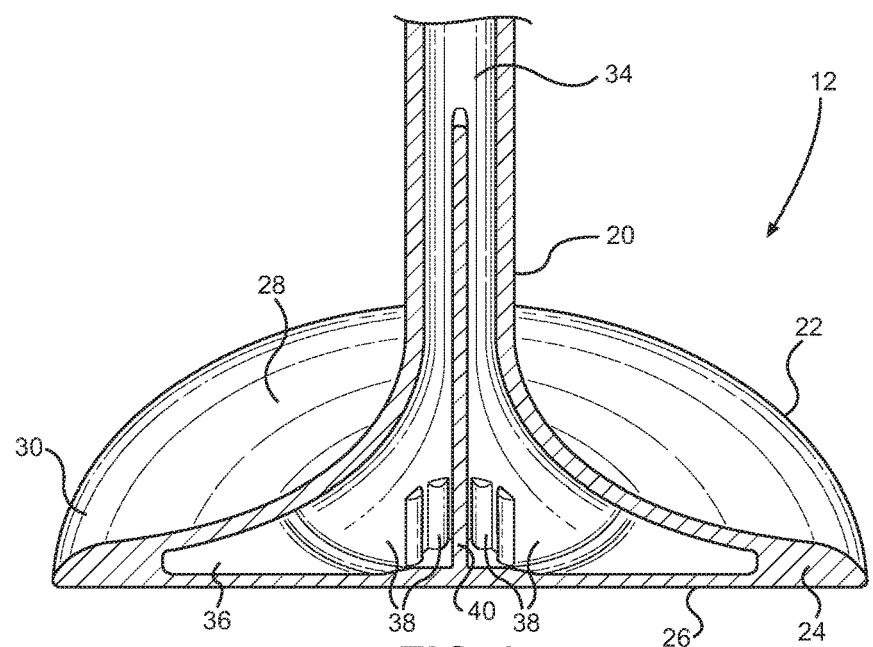
FIG. 3 is a perspective cross-section view of a part of the exemplary valve assembly.

A few inventive aspects of the disclosed embodiments are explained in detail below with reference to the various figures. Exemplary embodiments are described to illustrate the disclosed subject matter, not to limit its scope, which is defined by the claims. Those of ordinary skill in the art will recognize a number of equivalent variations of the various features provided in the description that follows.

I. Overall Structure

FIG. 1 illustrates an embodiment of a valve assembly 10 made in accordance with principles of the disclosed subject matter. The valve assembly 10 can include a valve head 12 joined to a valve stem 14 such that longitudinal axes of both the valve head 12 and the valve stem 14 align. The valve head 12 and the valve stem 14 may be joined by any appropriate method such as friction welding. However, alternate methods may be used including laser welding. Additionally, the valve head 12 and the valve stem 14 may be contiguously formed so as to constitute a single element.

The valve stem 14 may be formed so as to extend longitudinally from the valve head 12 to terminate at a valve tip 16, the valve tip 16 defining an end of the valve stem 14 opposite an end joined to the valve head 12. The valve stem 14 may be cylindrically shaped, having a circular or ovular cross-section. Alternatively, the valve stem 14 may have a rectangular or otherwise polygonal cross-section. The valve stem 14 may also have tapered ends such that a radius taken at either or both ends of the valve stem 14 is less than a radius taken at a portion of the valve stem 14 spaced inwardly therefrom. Conversely, a radius taken at either or both ends of the valve stem 14 may be greater than a radius taken at a portion of the valve stem 14 spaced inwardly therefrom. Additionally, the valve stem 14 may be tapered throughout rather than just through the ends.

As mentioned above, the valve stem 14 includes a valve tip 16 at the end opposite that which is joined to the valve head 12. The valve tip 16 may feature a planar surface at the terminating end of the valve stem 14 perpendicular to the longitudinal axis of the valve stem 14, the planar surface being configured for engagement with a tappet or similar device configured to displace the valve stem 14 along the longitudinal axis. Alternatively, the valve tip 16 may include an otherwise contoured surface at the terminating end of the valve stem 14. In some embodiments, the valve tip 16 may include a groove extending around a circumference of the valve stem 14. The groove may have a contoured interior so as to be concave.

The valve head 12 includes a connecting portion 20 and a plunger portion 22 that can be contiguously formed, the connecting portion 20 being configured to be joined to an end of the valve stem 14 as discussed above. In other words, the connecting portion 20 serves as an intermediary between the valve stem 14 and the plunger portion 22. The connecting portion 20 of the valve head 12 may be shaped similarly to the valve stem 14 such that the connecting portion 20 is approximately cylindrical in shape, or otherwise polygonal in shape. In the present embodiment, the connecting portion 20 extends from the valve stem 14 and has dimensions approximately similar to those of the valve stem 14.

The plunger portion 22 of the valve head 12 extends radially outward from the longitudinal axis of the connecting portion 20. A transition portion wherein the plunger portion 22 extends outward from the connecting portion 20 may be curved or contoured. The plunger portion 22 is approximately disc-shaped, as shown in greater detail in FIGS. 5 and 6. The plunger portion 22 has a thickness defining a plunger body 24 separating a fire face 26 from a ring face 28, the fire face 26 having a planar surface and the ring face 28 having a contoured surface incorporating a relatively large blend radius. The plunger body 24 is also defined circumferentially by a plunger side wall 30 that surrounds the plunger body 24. Alternatively, certain embodiments may include any number of plunger side walls such as one, two, three, four, etc. In yet other embodiments, the plunger portion 22 may be formed without any plunger side walls, and instead the fire face and the ring face may be contoured such as in a convex fashion, to contact one another around the circumference of the plunger body 24.

The plunger side wall 30 extending around the circumference of the plunger body 24 is configured so as to be engageable with an exemplary cylinder head of a combustion engine. Thus, the plunger side wall 30 defines a valve seat 32 which contacts a portion of the cylinder head that is shown in greater detail in FIGS. 4 and 8.

Referring to FIG. 2, a partial cross-section of the valve assembly 10 of FIG. 1 reveals a hollow shaft portion 34 extending from approximately the valve tip 16 to the transition portion of the valve head 12 wherein the plunger portion 22 extends outward from the connecting portion 20. In some embodiments, the hollow shaft portion 34 extends to the plunger portion 22 and into the plunger body 24, wherein the plunger body 24 is also partially hollow. The hollow shaft portion 34 may be a cylindrical space extending along the longitudinal axis of the valve assembly 10, or may otherwise be a polygonal space. In the present embodiment, the hollow shaft portion 34 is entirely contained within the valve assembly 10, with outer walls of the valve assembly 10 separating the hollow shaft portion 34 from an exterior environment to the valve assembly 10.

II. Reinforcing Ribs

Referring to FIG. 3, a cross-section of a part of the valve assembly 10 including the valve head 12 is shown. In the present embodiment, the valve head 12, and specifically the plunger portion 22 includes a hollow head portion 36 extending from an interior surface of the fire face 26 to the hollow shaft portion 34. Interior surfaces of the hollow head portion 36 may approximately track exterior surfaces of the plunger portion 22, maintaining approximately consistent thicknesses in material across the fire face 26, and also across the ring face 28. In some embodiments, thickness in material through the plunger side wall 30 may be greater than that of the fire face 26 or the ring face 28.

The valve assembly 10 of the present embodiment includes reinforcing ribs 38 positioned within the hollow head portion 36 of the plunger portion 22. The reinforcing ribs 38 extend radially around the longitudinal axis of the valve assembly 10 so as to form spokes around the axis. Each reinforcing rib 38 is formed so as to extend from interior surfaces of the hollow head portion 36, including top, bottom and side interior surfaces. For example, interior surfaces of the fire face 26 (bottom interior surface) and the ring face 28 (top interior surface) are joined by the reinforcing ribs 36, as well as the side interior surfaces of the hollow head portion 36 adjacent the plunger side wall 30. As discussed below, the reinforcing ribs 38 serve to conduct heat from a center of the fire face 36 outward towards edges of the fire face 36, and to the plunger side wall 30 and thereafter to the cylinder head through the valve seat 32. Other embodiments of the valve assembly 10 may utilize alternative configurations of the reinforcing ribs 38, or other structures to achieve heat dissipation. Additionally, the reinforcing ribs 38 improve structural integrity of the valve assembly 10 and specifically the valve head 12, providing add rigidity.

Figure 5:
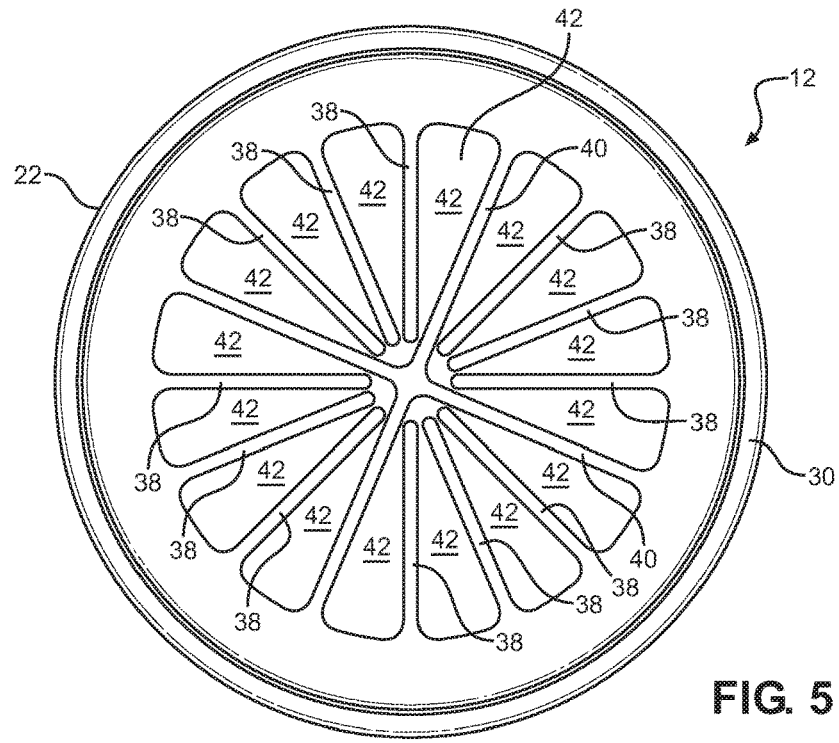
FIG. 5 is a cross-section view of the valve head of the exemplary valve assembly of FIG. 4.

In the present embodiment of FIG. 3, and as shown in more detail in FIG. 5, the reinforcing ribs 38 include intersecting ribs 40. The intersecting ribs 40 are configured to extend through a center of the valve assembly 10 along the longitudinal axis, while the other reinforcing ribs 38 are configured to terminate before intersecting the longitudinal axis. The intersecting ribs 40 therefore extend a distance within the hollow shaft portion 34 at the center of the valve assembly 10 so that portions of the intersecting ribs 40 crossing the longitudinal axis of the valve assembly 10 extend from the fire face 26 into the hollow shaft portion 34. In some embodiments, the aforementioned central portions of the intersecting ribs 40 extend into the connecting portion 20 of the valve head 12, while other embodiments include central portions that extend into the valve stem 14.

The intersecting ribs 40 of the exemplary embodiment serve to distribute combustion and closing loads from the valve stem 14 through the valve seat 32, as well as thermally transfer combustion heat from the fire face 26 to the valve stem 14 and the valve seat 32.

Figure 4:
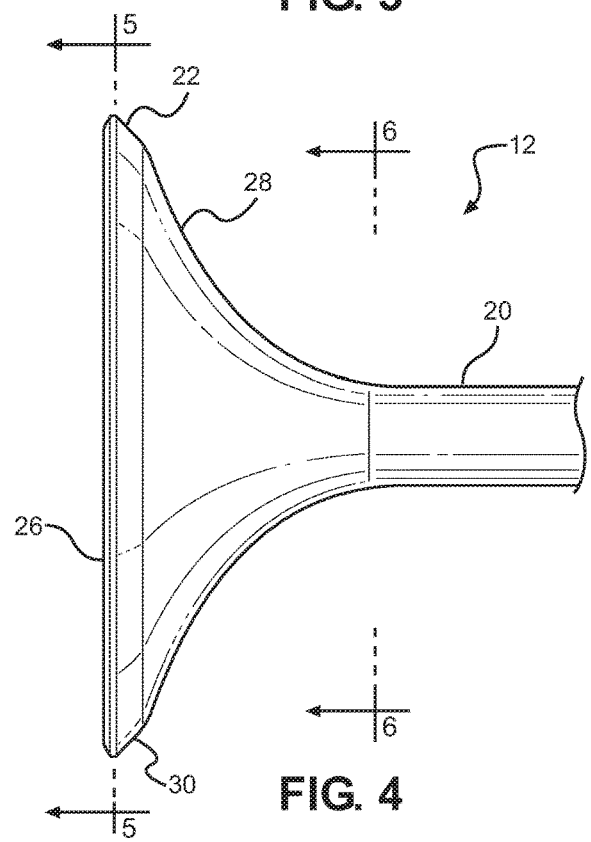
FIG. 4 is a plan view of a valve head of the exemplary valve assembly.

Referring to FIG. 4, a plan view of the valve head 12 of the exemplary valve assembly 10 is shown. In this embodiment, the fire face 26 is embossed and has sloping edges extending inwards towards the longitudinal axis of the valve assembly 10. Other configurations of the valve head 12 that do not feature the above-described elements including the embossed fire face 26 have also been considered. For example, the fire face 26 may be embossed so as to have sloping edges extending outwards away from the longitudinal axis, or may not be embossed at all.

Referring to FIG. 5, a cross-section view of the valve head 12 of the exemplary valve assembly 10 of FIG. 4 is shown. Specifically, FIG. 5 shows an exemplary orientation of the reinforcing ribs 38 and the intersecting ribs 40. As described above, the intersecting ribs 40 extend through the center of the valve assembly 10 defined by the longitudinal axis, while the reinforcing ribs 38 terminate before intersecting the longitudinal axis. In the present embodiment, a pair of intersecting ribs 40 extend through the center of the valve assembly 10, however embodiments including alternate numbers of intersecting ribs 40 have been contemplated, such as one, three, or any appropriate number of intersecting ribs 40 including none. Further, the present embodiment includes twelve reinforcing ribs 38, with three reinforcing ribs 38 approximately evenly spaced within each quadrant defined by the exemplary intersecting ribs 40. Other embodiments may include any alternate number and orientation of reinforcing ribs 38, including an equal number within each quadrant, as well as unequal numbers per quadrant. Some versions of the valve assembly 10 may include intersecting ribs 40 only, and completely omit reinforcing ribs 38 positioned between the intersecting ribs 40. Regarding embodiments that do not have the exemplary arrangement of the pair of intersecting ribs 40 creating quadrants spaced therebetween, the above discussed possibilities for orienting the reinforcing ribs 38 remain applicable to whatever gaps separate the intersecting ribs 40 from one another, if any.

Figure 7:
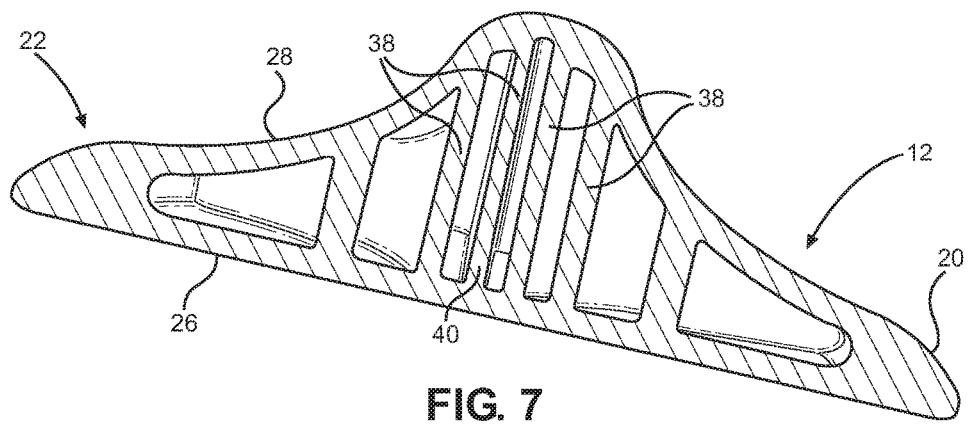
FIG. 7 is a perspective cross-section view of the valve head of the exemplary valve assembly of FIG. 6.

Also shown in FIG. 5, spaces defining circumferential gaps between the reinforcing ribs 38 and the intersecting ribs 40 constitute rib compartments 42. In the present embodiment, the rib compartments 42 are approximately triangular in cross-section, each having a base defined by the side interior surface of the hollow head portion 36 adjacent the plunger side wall 30, and sides defined by adjacent reinforcing ribs 38 and/or intersecting ribs. As shown in FIGS. 3 and 7, top and bottom walls of the rib compartments 42 are defined by interior surfaces of the ring face 28 and the fire face 26, respectively. The rib compartments 42 may be alternatively shaped in other embodiments, such as in a diamond shape, for example. Additionally, the rib compartments 42 may have flat bottom surfaces defined by an interior surface of the fire face 26.

Figure 6:
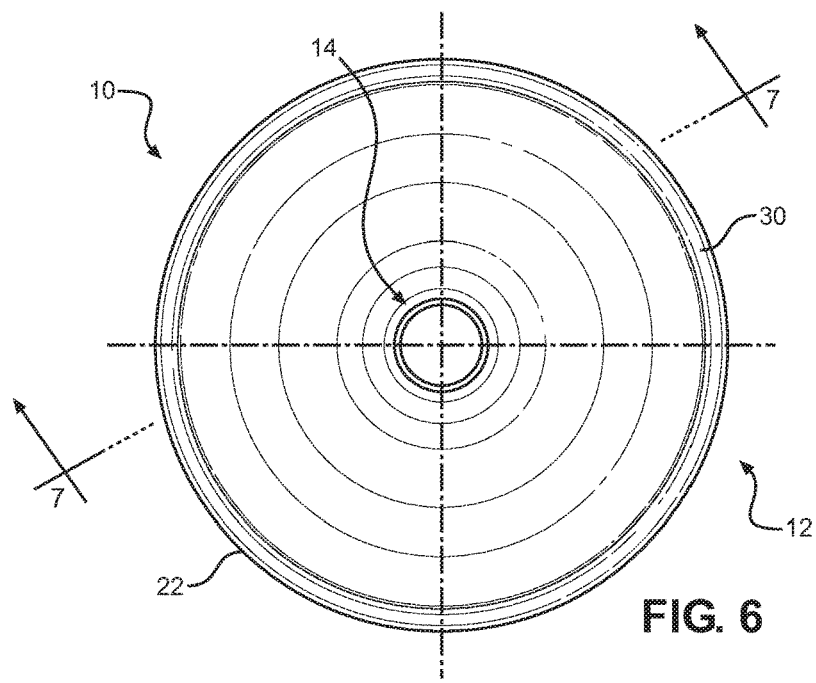
FIG. 6 is a top view of the exemplary valve assembly.

Referring to FIG. 6, a top view of the exemplary valve assembly 10 is shown. The valve assembly 10 of the present embodiment is shown with the ring face 28 of the valve head 12 having the approximately large blend radius contour to transition between the plunger portion 22 and the connecting portion 20.

Referring to FIG. 7, a perspective cross-section view of the valve head 12 of the exemplary valve assembly 10 of FIG. 6 is shown. The cross-section of FIG. 7 shows the reinforcing ribs 38 and/or the intersecting ribs 40 extending from the side interior surface of the plunger body 24 towards the center. In the present embodiment, both the reinforcing ribs 38 and the intersecting ribs 40 follow contours of the ring face 28 at the transition portion between the plunger portion 22 and the connecting portion 20 of the valve head 12. Therefore, ends of the reinforcing ribs 38 and the intersecting ribs 40 closest to the center of the plunger body 24 are taller than those joined to the side interior surface of the plunger body 24 adjacent the plunger side wall 30.

Figure 8:
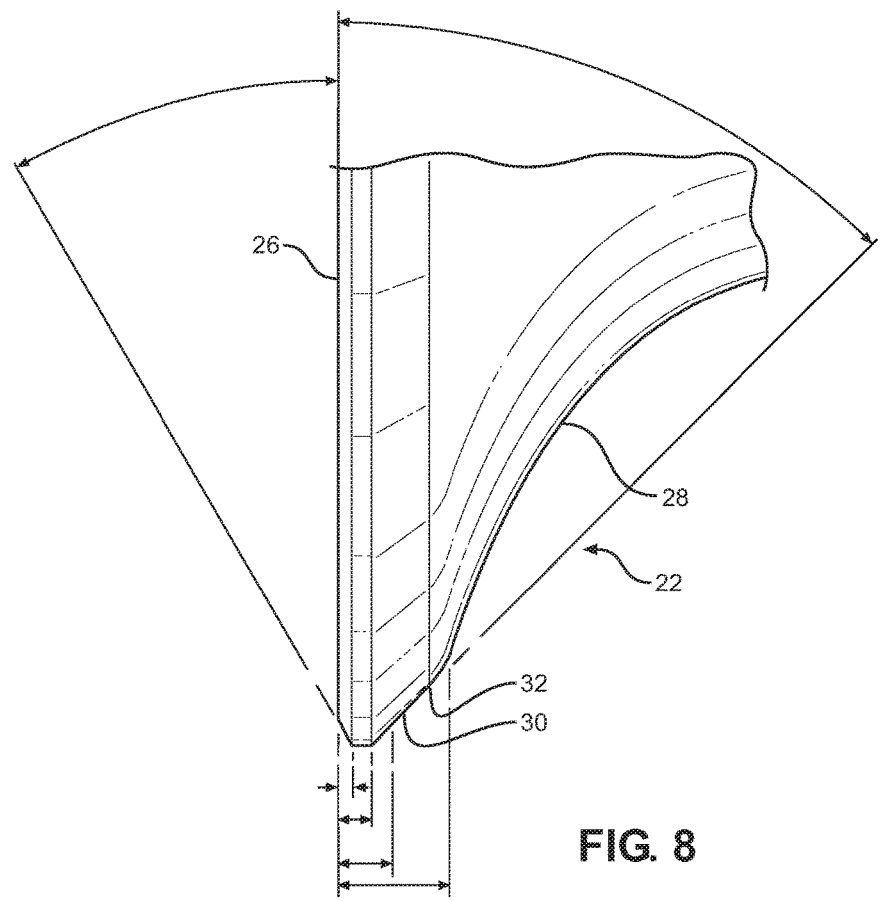
FIG. 8 is a plan view of a part of the valve head of the exemplary valve assembly of FIG. 1.
Figure 9:
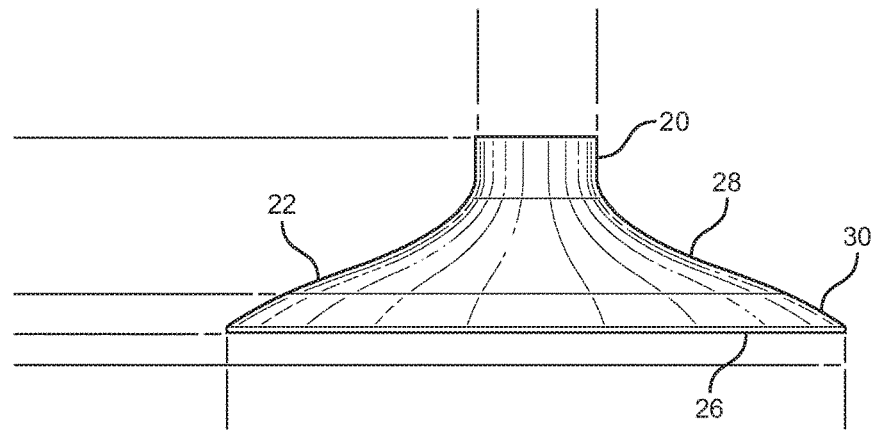
FIG. 9 is a plan view of a valve head of an alternative embodiment of the exemplary valve assembly.

Referring to FIG. 8, a plan view of a part of the valve head 12 of the exemplary valve assembly 10 of FIG. 1 is shown. The valve head 12 includes the valve seat 32 arranged along the plunger side wall 30. In the present embodiment, the valve seat 32 may be configured to include one sloped surface, two sloped surfaces intersecting at a vertex, or three or more sloped surfaces having multiple points of intersection. The valve seat 32 is configured to contact a portion of the cylinder head of the engine, and varying slope angles of the valve seat 32 and contacting surfaces may be preferable. The valve seat 32 serves the purpose of sealing the cylindrical chambers of the engine, and creating an adequate seal with appropriately sloped surfaces of the valve seat 32 may be achieved through multiple configurations.

Figure 10:
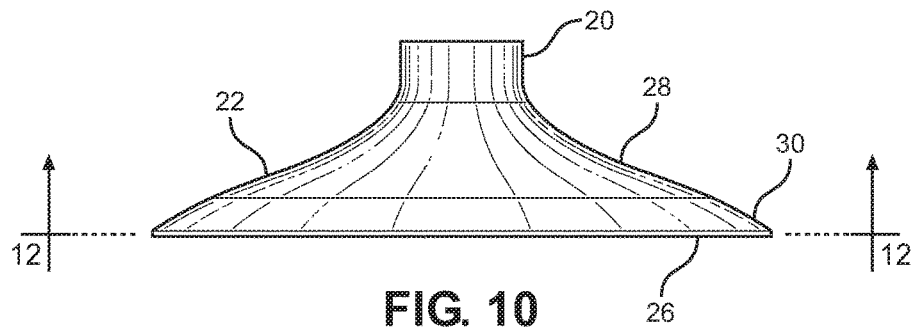
FIG. 10 is a plan view of the valve head of an alternative embodiment of the exemplary valve assembly.
Figure 12:
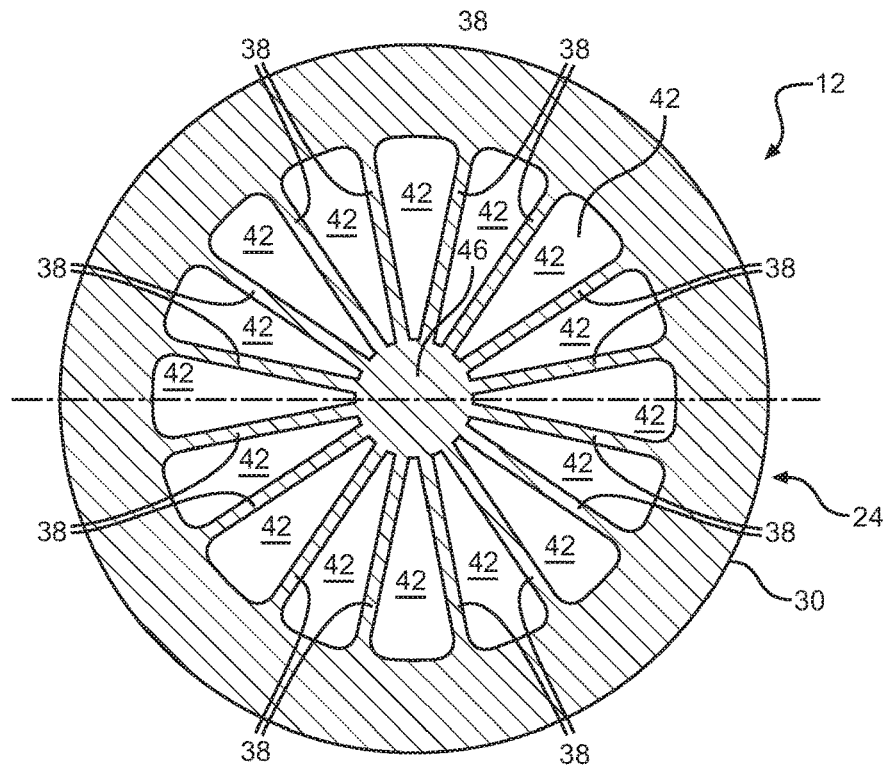
FIG. 12 is a cross-section view of a valve head of an alternative embodiment of the exemplary valve assembly of FIG. 10.

Referring to FIG. 12, a cross-section view of a valve head 12 of an alternative embodiment of the exemplary valve assembly 10 of FIG. 10 is shown. In the alternate embodiment shown in FIG. 12, the valve assembly 10 is configured to include reinforcing ribs 38 that each extend to a central column 46 formed in the center of the plunger body 24. As shown in FIG. 12, the alternate embodiment of the valve head 12 includes sixteen reinforcing ribs 38. However, any other appropriate number of reinforcing ribs 38 may be used, including both greater and fewer than sixteen. The central column 46 is approximately circular in cross-section in the alternate embodiment shown in FIG. 12, however the central column 46 may alternatively be ovular or polygonal in cross-section. Rib compartments 42 are formed in between adjacent reinforcing ribs 38, the rib compartments 42 being approximately triangular in the alternative embodiment shown in FIG. 12. However, the rib compartments 42 may be otherwise shaped to achieve the desired characteristics of the valve head 12. Since the reinforcing ribs 38 extend from an inside surface of the plunger side wall 30 to the central column 46, the rib compartments 42 are closed without openings.

Figure 11:
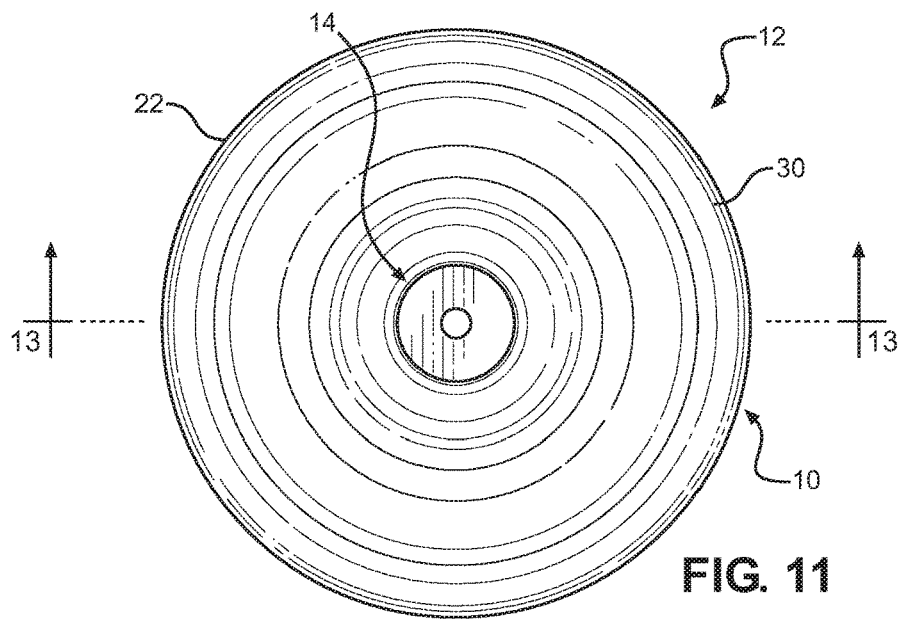
FIG. 11 is a top view of an alternative embodiment of the exemplary valve assembly.
Figure 13:
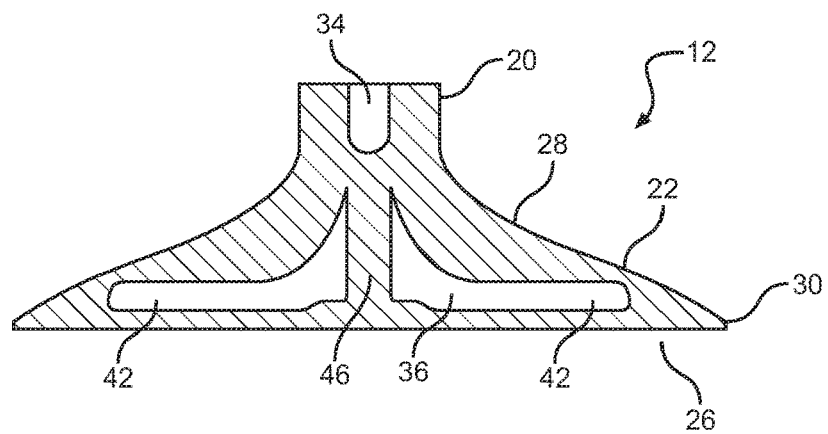
FIG. 13 is a cross-section view of a valve head of an alternative embodiment of the exemplary valve assembly of FIG. 11.

Referring to FIG. 13, a cross-section view of the valve head 12 of an alternative embodiment of the exemplary valve assembly 10 of FIG. 11 is shown. The alternate embodiment illustrates the orientation of the central column 46 surrounded by the rib compartments 42 that are spaced between the reinforcing ribs 38 (shown in FIG. 12). As shown, the central column 46 terminates at the connecting portion 20 so as to be spaced from the hollow shaft portion 34. In the embodiment shown, a width of the central column 46 is approximately equal to that of the hollow shaft portion 34. However, other configurations of both the central column 46 and the hollow shaft portion 34 have been considered, such as one in which the width of the central column 46 is either greater or less than that of the hollow shaft portion 34.

III. Alternative Embodiments

While certain embodiments of the invention are described above, and FIGS. 1-13 disclose the best modes for practicing the various inventive aspects, it should be understood that the invention can be embodied and configured in many different ways without departing from the spirit and scope of the invention.

For example, in the disclosed embodiments, the disclosed valve assembly is an intake valve assembly configured for use with the combustion engine of a vehicle. Vehicles having combustion engines with the disclosed valve assembly may include cars, trucks, buses, motorcycles, boats, aircraft and locomotives. However, the disclosed valve assembly may alternatively be used with any type of valve configuration, including for example an exhaust valve assembly. Furthermore, the disclosed valve assembly may be configured for use in other powered mechanisms in non-vehicular applications, such as portable equipment/machinery, for example.

As disclosed above, embodiments are intended to be used with any type of combustion engine. The engine can be configured as a gasoline engine, a diesel engine or a gas turbine engine. In the case of gasoline or diesel, the engine can have any number of cylinders with valve assemblies, such as one, two, three, four, five, etc. The combustion engines may also be port injection or direct injection systems. In vehicular applications, the combustion engine can be configured as part of a system including an electric motor such as in a hybrid propulsion system. Moreover, the engine can be mounted forward of the front axles, rearward of the rear axles, or intermediate the front and rear axles in vehicular applications. The engine output axis can also be oriented in the longitudinal direction or in the transverse direction of the vehicle.

In the disclosed embodiment, the valve assembly utilizes a poppet configuration in which a spring biases the poppet valve towards a closed state while a tappet intermittently pushes the poppet valve into an opened state. However, the valve assembly may additionally utilize other valve opening mechanisms such as an overhead camshaft with a pivoted rocker-arm, for example.

Embodiments are also intended to include or otherwise cover methods of manufacturing any or all of the elements disclosed above. The methods of manufacturing include or otherwise cover processors and computer programs implemented by processors used to design various elements of the valve assembly.

While subject matter has been described in detail with reference to exemplary embodiments thereof, it will be apparent to one skilled in the art that various changes can be made, and equivalents employed, without departing from the scope of the invention. All related art references discussed in the above Background section are hereby incorporated by reference in their entirety.

What is claimed is:

1. A valve assembly for use with a combustion engine, comprising:
    a valve stem having a plunger end; and
    a valve head having a central axis and a stem portion connected to the plunger end of the valve stem, the valve head having a hollow interior portion defining interior floor and ceiling surfaces, the interior floor surface terminating at an outer circumference of the hollow interior portion, the valve head including ribs that extend between the interior floor and ceiling surfaces and that extend radially around the valve head central axis from within the stem portion to the outer circumference of the hollow interior portion, the ribs being configured such that a majority of an upper surface of each rib contacts the ceiling surface, at least one of the ribs intersecting the central axis of the valve head, and at least one of the ribs extending from the outer circumference of the hollow interior portion and terminating at a location that is spaced away from the central axis.

2. The valve assembly according to claim 1, wherein at least one of the ribs extends from the outer circumference of the hollow interior portion of the valve head into the valve stem.

3. The valve assembly according to claim 1, wherein at least one of the ribs extends from the outer circumference of the hollow interior portion of the valve head, through the stem portion, to the outer circumference of the hollow interior portion on an opposing side of the valve head.

4. The valve assembly according to claim 3, wherein the at least one of the ribs extends into the valve stem.

5. The valve assembly according to claim 1, wherein at least one pair of ribs extends from the outer circumference of the valve head, through the stem portion, to the respective outer circumference on an opposing side of the valve head.

6. The valve assembly according to claim 5, wherein the at least one pair of ribs extends into the valve stem.

7. The valve assembly according to claim 5, wherein the at least one pair of ribs are perpendicular relative to each other about the central axis of the valve head.

8. The valve assembly according to claim 1, wherein the plunger end of the valve stem is connected to the stem portion of the valve head such that the ribs terminate before the valve stem.

9. The valve assembly according to claim 1, wherein the valve head includes a column disposed at the stem portion and extending along the central axis such that the ribs extend from the column to the outer circumference of the hollow interior portion.

10. The valve assembly according to claim 9, wherein adjacent ribs form side walls of compartments, the compartments having top and bottom surfaces defined by the floor and ceiling surfaces, respectively, and a base wall defined by the outer circumference of the hollow interior portion of the valve head.

11. A valve head assembly for use with a valve stem having a plunger end that thereby forms a valve assembly for use with a combustion engine, the valve head assembly comprising:
a valve head having a central axis and a stem portion, the valve head having a hollow interior portion defining interior floor and ceiling surfaces, the interior floor surface terminating at an outer circumference of the hollow interior portion, the valve head including ribs that extend between the interior floor and ceiling surfaces and that extend radially around the valve head central axis from within the stem portion to the outer circumference of the hollow interior portion, the ribs being configured such that a majority of an upper surface of each rib contacts the ceiling surface, at least one of the ribs intersecting the central axis of the valve head, and at least one of the ribs extending from the outer circumference of the hollow interior portion and terminating at a location that is spaced away from the central axis.

12. The valve head assembly according to claim 11, wherein at least one of the ribs extends from the outer circumference of the hollow interior portion of the valve head into the valve stem.

13. The valve head assembly according to claim 11, wherein at least one of the ribs extends from the outer circumference of the hollow interior portion of the valve head, through the stem portion, to the outer circumference of the hollow interior portion on an opposing side of the valve head.

14. The valve head assembly according to claim 13, wherein the at least one of the ribs extends into the valve stem.

15. The valve head assembly according to claim 11, wherein at least one pair of ribs extends from the outer circumference of the valve head, through the stem portion, to the respective outer circumference on an opposing side of the valve head.

16. The valve head assembly according to claim 15, wherein the at least one pair of ribs extends into the valve stem.

17. The valve head assembly according to claim 15, wherein the at least one pair of ribs are perpendicular relative to each other about the central axis of the valve head.

18. The valve head assembly according to claim 11, wherein the plunger end of the valve stem is connected to the stem portion of the valve head such that the ribs terminate before the valve stem.

19. The valve head assembly according to claim 11, wherein the valve head includes a column disposed at the stem portion and extending along the central axis such that the ribs extend from the column to the outer circumference of the hollow interior portion, and adjacent ribs form side walls of compartments, the compartments having top and bottom surfaces defined by the floor and ceiling surfaces, respectively, and a base wall defined by the outer circumference of the hollow interior portion of the valve head.

20. A method of manufacturing a valve assembly for use with a combustion engine, the method comprising:
providing a valve stem having a plunger end; and
connecting a valve head having a central axis and a stem portion to the plunger end of the valve stem, the valve head having a hollow interior portion defining interior floor and ceiling surfaces, the interior floor surface terminating at an outer circumference of the hollow interior portion, the valve head including ribs that each extend between the interior floor and ceiling surfaces and that extend radially around the valve head central axis from within the stem portion to the outer circumference of the hollow interior portion, the ribs being configured such that a majority of an upper surface of each rib contacts the ceiling surface, at least one of the ribs intersecting the central axis of the valve head, and at least one of the ribs extending from the outer circumference of the hollow interior portion and terminating at a location that is spaced away from the central axis.

* * * * *